United States Patent Office 2,877,742
Patented Mar. 17, 1959

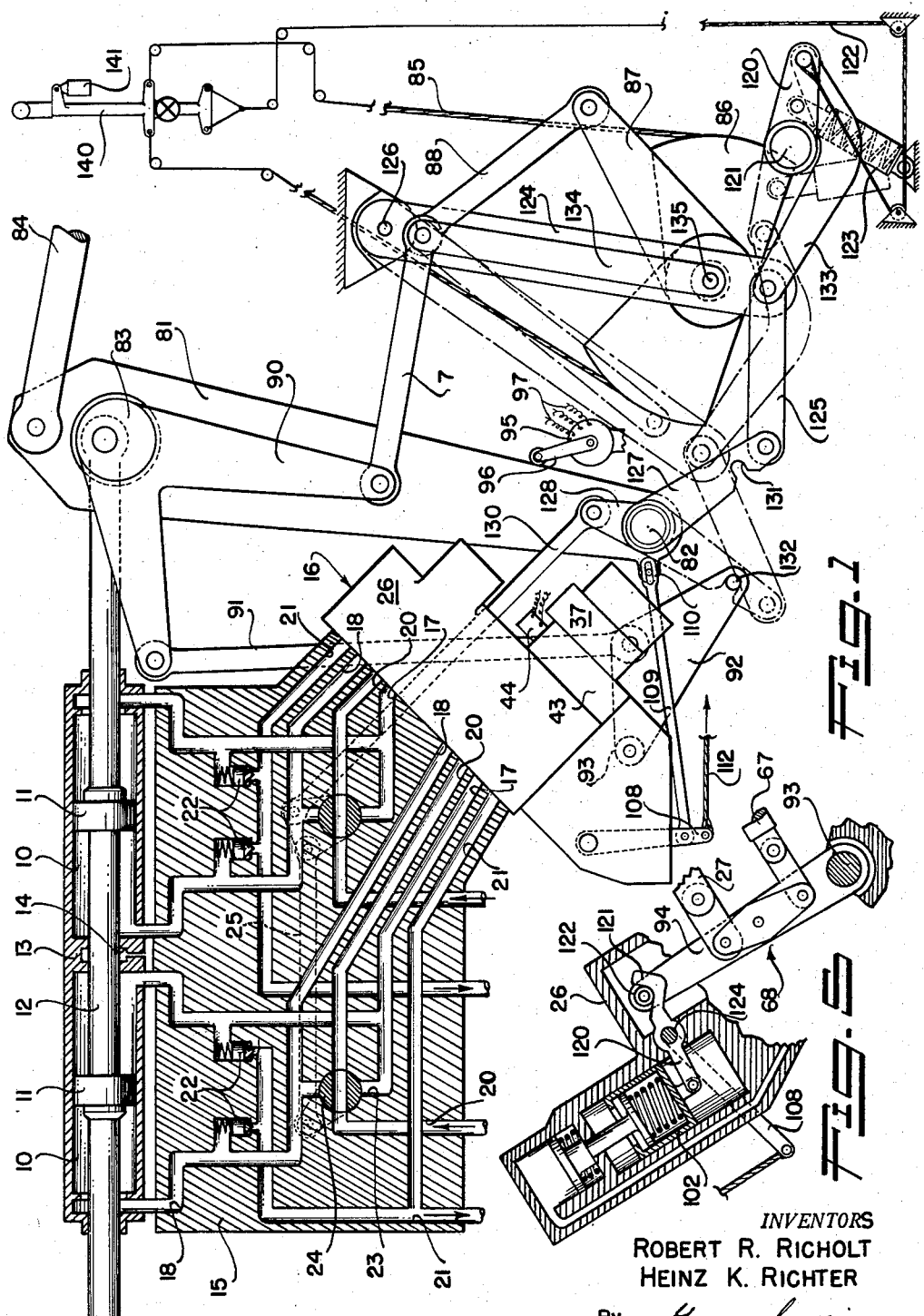

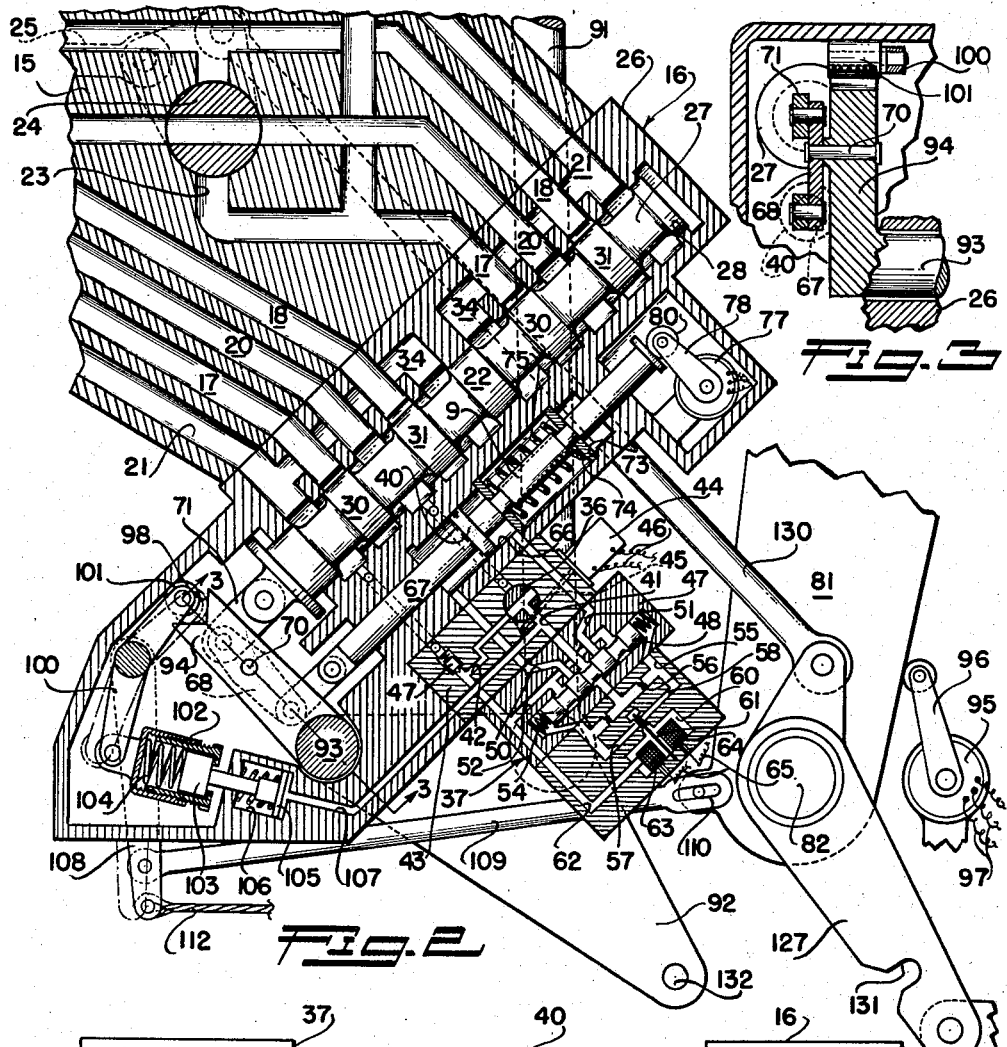
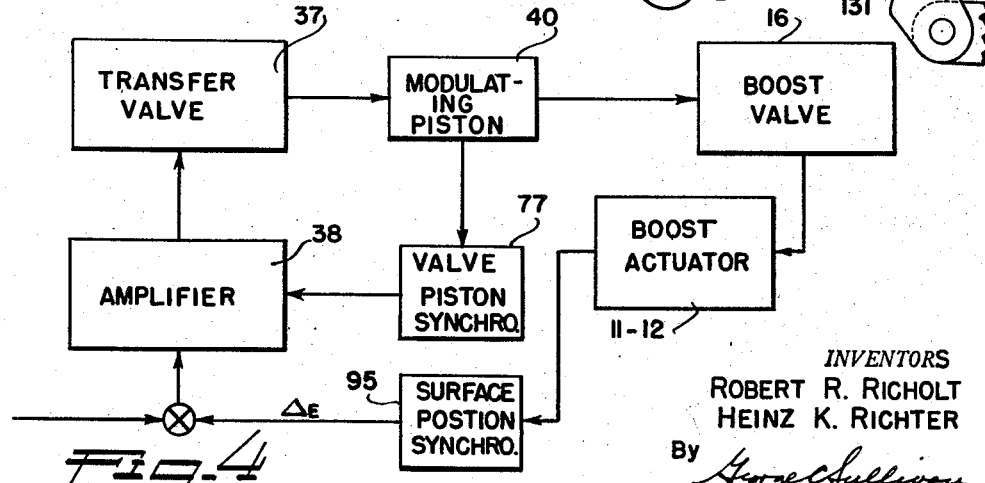

2,877,742

AUTOPILOT-POWER CONTROL SERVO MECHANISMS

Robert R. Richolt and Heinz K. Richter, Los Angeles, Calif., assignors to Lockheed Aircraft Corporation, Burbank, Calif.

Application November 9, 1955, Serial No. 545,958

12 Claims. (Cl. 121—41)

This invention relates to the control and actuation of the aerodynamic control surfaces of aircraft and relates more particularly to a combined hydraulic booster autopilot and damping system.

In modern aircraft booster systems are employed extensively to amplify the control forces applied by the pilot to the control stick and pedals. These hydraulic booster systems are usually designed to feed a portion of the aerodynamic loads imposed on the control surfaces back to the control stick to provide the pilot with a suitable "feel" while in other cases the boosters are in the nature of irreversible power servo mechanisms incorporating artificial "feel" means. Where autopilots are employed in conjunction with the booster and control system the autopilot servo is sometimes connected with the pilot input end of the hydraulic booster or power control servo while in other installations a low power electro-hydraulic transfer valve responsive to the autopilot is employed to control or drive the booster actuator. In these earlier methods of tying the autopilot to the booster control system there are servos connected in cascade relation so that the operating response is slow and due to the complexity of such earlier systems they are subject to unwanted and dangerous oscillation and other undesirable actions. Difficulty has also been encountered in providing safe and practical means for limiting the authority of the autopilot, in limiting the maximum angular rate of aerodynamic control surface motion, in controlling or limiting the acceleration of the control surfaces and in preventing excessive displacement of the control surfaces in the event of "hard over" failure in the autopilot circuit. Furthermore, and of considerable practical importance, are the weight and space factors involved in the current and earlier systems wherein the component devices are separate and somewhat remote from one another, making the overall installations heavy and requiring large volume spaces for their installation.

It is an object of this invention to provide an autopilot power booster control system or mechanism that is compact, light in weight, and simple, dependable and efficient in operation. In the system or mechanism of this invention a considerable portion of the required linkage is within the valve "package" necessitating less installation space, reducing the weight, reducing the number of seals required and, therefore, the number of potential leakage areas, assuring tight connections with the booster valve and reducing the friction in the pilot input system.

Another object of the invention is to provide a mechanism of the character mentioned characterized by a direct tie-in of the autopilot and stabilization signals to the airplane power control servo. There is a single valve and actuator servo system for damper and autopilot operations.

Another object of the invention is to provide a mechanism of this kind wherein the various necessary components in the manual control valve are integrated in one "package" without the need for additional external linkages, plumbing, hoses, or the like. The integration in one unit of the several elements or components reduces the friction, lag, and the backlash which occur in earlier systems and which have such detrimental effects on the servo system.

Another object of the invention is to provide a hydraulic booster or power control-autopilot mechanism wherein the following components and their associated essential parts are included or incorporated in a single, compact, light-weight assembly; (a) the actuating power or booster cylinder and pistons, (b) the booster control valve, (c) the hydraulic porting or manifolding between the control valve and the booster cylinders, including the bypass and shut-off valves for the latter, (d) the autopilot bypass and transfer valve for controlling the booster control valve, (e) the modulating cylinder and piston mechanism interposed between the transfer valve and the boost control valve, (f) the valve position synchro associated with said modulating piston, (g) and internal linkages between the boost valve and modulating piston as well as certain limit or control instrumentalities for the several phases of operation of the overall mechanism. These several components or devices are closely and intimately coupled for cooperation with a minimum of friction, play, backlash and lag and for ready control by the pilot input means, the autopilot input circuits, the emergency disconnect means, the surface position synchro, the manual operation lock-in, etc.

Another and important object of the invention is to provide a hydraulic booster-autopilot-damper mechanism having a plurality of separate and individually regulable means or devices for limiting the action or authority of the autopilot to assure safe operation of the control surfaces and the airplane under various conditions and circumstances. Four of the conditions where the limitation of authority arise are: (1) When large forces resulting from a change in damping of the input or output or from a sudden or heavy load on the control surface of from an extremely large signal from the autopilot are exerted, the large forces act on the linkage and override the detent means of the invention displacing the boost valve in the direction necessary to relieve the disturbing force. (2) The velocity or maximum angular rate of motion of the aerodynamic control surface is determined or "limited" by stop means for limiting the stroke or travel of the modulating piston, which in turn limits the stroke of the boost valve, this stop means being readily designed to effect the desired authority for any given installation. (3) The ecceleration of the control surface is limited by the fluid flow rate of the autopilot transfer valve to restrict or govern the velocity of the modulating piston which, in turn, directly governs the velocity connected with which the boost control valve spool is moved. This limiting of velocity of the boost valve spool asserts limiting authority over the acceleration of the aerodynamic control surfaces. (4) The extent to which the autopilot can move or control the aerodynamic control surfaces in the event of a "hard-over" failure in the autopilot circuit is determined by a link or cam means acting between the output arm and the aforementioned detent means to release the detent when the surface reaches the predetermined setting of the cam or link. Thus the link or cam means which may be designed, regulated or set independently of the other instrumentalities imposes a limitation on the authority of the autopilot, preventing excessive control surface motion in the event of a hard-over malfunction in the autopilot. The above mentioned separate "limits" on the authority or action of the autopilot are adjustable independently of one another and provide safety restrictions that cannot be achieved with the usual or conventional electrical servo means. In addition to the above enumerated "limits" on the authority of the autopilot, the linkage and detent means of the invention serve to limit the authority of the autopilot according to any acceleration responsive means associated with the control stick or other portion of the pilot control system. Thus in addition to condition (1) an excessive force applied by the pilot will release the detent means and where the manual control system is equipped with an acceleration responsive "bob weight" a sudden or excessive change in the direction of flight will also release the detent means, the detent means thus serving to control or limit accelerations applied to the airplane. Furthermore, it should be understood the mechanism of the invention is fully operative and useful in systems incorporating "feel" means as well as systems having "artificial feel" means, the artificial feel means in the latter instance serving to replace the aerodynamic feed back.

Other objectives and features of the invention will become apparent from the following detailed description of typical preferred embodiments throughout which description reference will be made to the accompanying drawings in which:

Figure 1 is a more or less diagrammatic view of a system or mechanism incorporating the invention with the actuating cylinder and manifolding thereof appearing in cross section and with certain of the external linkage appearing in broken lines in the boost-off or manual position;

Figure 2 is an enlarged sectional view of a portion of the mechanism illustrating the hydraulic booster control valve, the modulating cylinder, the transfer valve, the detent means and associated parts in normal operating positions;

Figure 3 is an enlarged fragmentary transverse sectional view taken substantially as indicated by line 3—3 on Figure 2;

Figure 4 is a block diagram of the system and associated instrumentalities as incorporated in a typical aircraft control surface actuating relationship; and Figure 5 is a fragmentary sectional view illustrating another form or configuration of detent means of the mechanism.

The drawings illustrate the invention incorporated in a hydraulic booster-damper and autopilot tie-in system for the actuation of aerodynamic control surface means of an aircraft. As best shown in Figure 1, the mechanism is preferably designed and employed as a one unit or "package" arrangement to reduce weight, conserve space, minimize fluid and electrical connections and to assure close coupled actuation of the several elements or components with a minimum of friction and time lag. The actuating cylinders 10 are axially aligned and the piston rod 12 extends through openings in the outer ends of the cylinders to be slidably guided therein and to have one end operatively connected with the pilot operated or controlled linkage or lever means, as will be later described. The piston rod 12 also slidably passes through a partition 13 separating the two cylinders 10, there being a suitable leakage drain 14 in the partition.

A manifold 15 is associated with or carries the cylinders 10 and is ported to conduct the pressure fluid to and from the ends of the two cylinders 10 and to and from the booster control valve means 16 and other instrumentalities to be subsequently described. The cylinders 10, and their pistons 11, may constitute substantially identical units and the manifold 15 is provided with two sets or arrangements of ports for the two cylinders, which sets or arrangements may also be substantial duplicates. The purpose of this duplication of the cylinders and porting is to provide for operation of the hydraulic booster by either one of the two cylinder and piston arrangements by hydraulic pressure from either one of two hydraulic pressure supply systems in the event of failure of one of such supply systems. It is to be understood the invention is not restricted or confined to employment with such dual booster cylinder means and dual porting and pressure supplies since it is equally applicable in situations where a single cylinder and piston booster is employed provided with a single porting arrangement. Since the porting systems for the two cylinders 10 are identical we will describe the porting for one of the cylinders, it being apparent that such description is equally applicable to the other set of ports.

The manifold 15 has a port 17 extending from an end of each cylinder 10 to the booster control valve 16 and a similar port 18 extending from the other end of the cylinder to the valve 16. The manifold 15 is further provided with a pressure port 20 supplied with actuating fluid pressure or hydraulic fluid pressure from a pressure source, not shown, and leading to the control valve 16 and has a return port 21 leading from the valve 16 back to the external fluid pressure system, not shown. As will later become apparent the control valve 16 is operable to connect the cylinder port 17 with the pressure supply port 20 while putting the cylinder port 18 in communication with the return port 21 and upon reversal the valve is operable to connect the cylinder port 18 with the pressure supply port 20 while providing communication between the return port 21 and the cylinder port 18. Check valves 22 are interposed between the cylinder ports 17 and 18 and the related return ports 21 to insure against cavitation in the cylinders 10 when only one cylinder and piston unit is operating and the other unit has no hydraulic pressure therein. Furthermore, the pair of ports 17 and 18 of each cylinder 10 is connected intermediate its ends by a bypass port 23 controlled by a valve 24. The above mentioned pressure port 20 of the manifold 15 intersects the bypass port 23 at the valve 24 and the valve serves both as a bypass valve and a pressure shut-off valve. That is in one position the valve 24 serves to close the bypass port 23 while permitting free fluid flow through the pressure port 20, as shown in Figure 1, and in the other position the valve closes the pressure port 20 and permits free fluid flow through the bypass port 23 and thereby puts the opposite ends of the cylinder 10 in communication. The shut-off and bypass valves 24 for the port systems of the two cylinders 10 are operatively connected by a link 25, appearing in Figures 1 and 2 in broken lines, to be operated in unison between the two positions just described.

The booster control valve 16 is shown incorporated in a block 26 secured on a pad or face of the manifold 15 and this block carries and houses various other elements of the mechanism. It is to be understood that the block 26 is preferably rigid and stationary with respect to the manifold 15 and may, if desired and practical, be formed as a part of the manifold. The valve 16 includes a spool 27 movable axially in a smooth elongate bore 28 in the block 26. The valve spool 27, which is moved or operated both during hydraulically boosted manual control of the mechanism and autopilot control of the mechanism, has two sets of lands controlling the above described cylinder ports 17 and 18 with respect to their communication with the pressure supply and return ports 20 and 21. As seen in Figure 2, the ports 17, 18, 20 and 21 continue from the manifold 15 through the block 26 to communicate with the valve bore 28. There are two lands 30 and 31 for controlling each pair of cylinder ports and an intermediate land 22 common to the two groups or sets. The ports 17, 18, 20 and 21 have circular or annular communication with the valve bore 28 and the lands 30, 31 and 22 are circular to cooperate with the wall of the bore 28 at the annular terminals of the ports. The lands 30 control the cylinder ports 17 while the lands 31 control the cylinder ports 18. It will be seen in Figure 2 that the pressure ports 20 communicate with the valve bore 28 in regions between the cylinder ports and the return ports 21 are provided with branches 34 in the block 26 to have annular communication with the bore adjacent the innermost cylinder port of each set so that the pressure return system communicates with the valve bore adjacent a side of each cylinder port 17 and 18. With the valve spool 27 in the closed or intermediate position shown in Figure 2, its lands 30 and 31 close the cylinder ports 17 and 18, that is the cylinder ports are closed from both the pressure ports 20 and the pressure return ports 21. Upon movement or displacement of the valve core 27 in one direction, say to the right as viewed in Figure 2, the cylinder ports 18 are uncovered to the supply pressure ports 20 while the cylinder ports 17 are opened to the pressure return ports 21. This results in actuation of the piston 11 and the rod 12 to the right. On the other hand, when the valve core or spool 27 is moved to the left, as viewed in Figure 2, the cylinder ports 17 are open to the pressure ports 20 and the ports 18 are opened to the pressure return ports 21 so that the boost actuator rod 12 is moved to the left. The means for actuating or moving the booster control valve spool 27 will be subsequently described.

The mechanism further includes a shut-off valve 36 and a transfer valve 37 controlled by signals from the amplifier 38 of the autopilot to operate a modulating piston 40 which, in turn, is operatively connected with the control valve spool 27 to effect movement of the same and thus move the aerodynamic control surface of the airplane during autopilot operation. The shut-off valve 36 may be of the rotary type and is arranged to control intersecting ports 41 and 42 communicating respectively with a pressure port 20 and a pressure return port 21. In practice, the valve 36 may be in a block or case 43 on the above described block 26 and the ports 41 and 42 may lead through the block 24 and the case 43 to the transfer valve 37, to be subsequently described. The shut-off valve 36 is actuated by a solenoid 44 through a linkage 45, the solenoid in turn being energized by the autopilot through electrical leads 46. The valve 36 is movable between the "closed" position shown in Figure 2 where the pressure port 41 is closed and the return port 42 is open and the "open" position where the pressure port 41 is open to allow a pressure flow to the transfer valve 37 and the return port 42 is closed. The return port 42 may include a spring loaded check valve 47 to reduce or eliminate surges in the system affecting the transfer valve.

The transfer valve means 37 is responsive to electrical signals from the autopilot to control the flow of actuating fluid pressure to the modulating piston 40 and thus effect movement of the boost control valve 16 for autopilot operation of the aerodynamic control surface. The autopilot control valve or transfer valve 37 includes a casing 47 in which a spool 48 is slidable to control the terminae of two ports 50 and 51. These ports 50 and 51 lead through the casings 47 and 37 and into the block 26 to the modulating piston 40. As will be described subsequently in more detail, the pressure from one port 50 acts on one side of the piston 40 and the pressure supplied from the other port 51 acts on the opposite side of the piston. The pressure port 41, above described, leads to a point between the ends of the ports 50 and 51 and the spool 48 of the transfer valve is movable in one direction to put the port 50 in communication with the pressure port 41 and is movable in the other direction to place the pressure port in communication with the other port 51. The pressure return port 42 has two branches 52, whose ends are controlled by the spool 48. The ends of these port branches 52 are related to the ports 50 and 51 so that one branch 52 is put into communication with the port 50 when the port 51 is put in connection with the pressure port 41 by movement of the spool 48 in one direction and the other branch 52 is placed in communication with the port 51 when the spool is moved to place the port 50 in communication with the pressure port 41. Springs 54 act on the ends of the spool 48 to normally center the spool where it closes the ends of the ports 50 and 51.

The transfer valve means 37 further includes a reed valve responsive to the signals from the autopilot to, in turn, displace or move the spool 48. The pressure port 41 continues past the spool 48 and has branches 55 leading to the opposite ends of the spool 48 which operate as plungers. Restrictors 56 are provided between the pressure port 41 and its branches 55 and pressure control ports 57 and 58 extend from the branches 55 to a pressure bleed chamber 60. The ends of the branches 55 communicating with the chamber 60 are in spaced opposing relation and are controlled by a reed valve 61. A port 62 connects the bleed chamber 60 with the return port 42 of the casing 37 and block 26. So long as the reed valve 61 is in its neutral position, pressure bleeds uniformly or equally from the branch ports 55 so that the spool 48 remains in its central position where the ports 50 and 51 are closed and out of communication with the pressure supply port. The reed valve 61 is responsive to signals from the autopilot, not shown. Electromagnetic windings or coils 63 and 64 are arranged at opposite sides of the reed 61 and electrical leads 65 carry signals from the autopilot to the coils. Upon the coils 63 and 64 receiving differential signals from the autopilot the reed valve 61 is moved one way or the other to close or restrict one of the branch ports 55. When one branch port is restricted or closed, hydraulic pressure builds up in the port and this pressure acting on the related end of the valve spool 48 moves the spool to a position to put either the port 50 or the port 51 in communication with the pressure port 41. Movement or actuation of the reed valve 61 in the other direction blocks or restricts the other branch port 55, causing pressure to build up in the same to move the spool 48 in the opposite direction thus opening the other port 50 or 51 to the pressure port 41.

The modulating piston 40 operates in a bore or cylinder 66 in the block 26 and is fixed to a rod 67. This rod 67 is slidable in the block 26 in substantially parallel relation to the spool 27 of the booster control valve 16 and extends beyond the opposite ends of the bore or cylinder 66. In accordance with the invention the piston rod 67 is operatively connected with the spool 27 of the booster control valve means. This operative connection includes a lever 68 pivoted intermediate its ends on a pin 70. The ends of lever 68 are connected with corresponding ends of the spool 27 and rod 67 by pivoted links 71. It will be seen that axial movement of the modulating piston rod 67 is transmitted to the spool 27 to cause longitudinal movement of the same. The above mentioned ports 50 and 51 leading from the transfer valve 37 communicate with the opposite ends of the cylinder 66 so that differential fluid pressures supplied to the cylinder as a result of operation of the reed valve 61 and spool 48, as above described, produce movement or translation of the piston 40 and rod 67 in one direction or the other which, in turn, results in movement of the valve spool 27. This, in turn, causes movement or operation of the pistons 11 and rod 12 of the boost actuator to operate the aerodynamic control surface, not shown, through the linkage to be later described.

It is a feature of the invention that the modulating piston means 40—67, just described, operates during autopilot operation to restrict the maximum travel of the boost control valve spool 27 to determine the maximum angular rate of aerodynamic control surface motion. A yielding or spring-loaded stop or limiting means is associated with the modulating piston means to accomplish this. Two opposing shoulders 73 on the wall of the cylinder bore 66 are engaged by two spaced washers 74 which have limited relative axial movement on the modulating piston rod 67. A tubular spacer 9, of selected length, on the rod 67 has its ends positioned to engage the washers 74. The washers 74 are yieldingly urged apart to their maximum spacing by a spring 75 and are engaged against the shoulders 73. It will be seen that upon operation of the transfer valve 37 producing sudden and extensive movement of the modulating piston 40 the spacer 9, engaging a washer 74, serves to limit movement of the rod and modulating piston as well as the valve spool 27 connected therewith and thereby limits or determines the maximum angular rate of motion of the control surface, not shown. The length of the spacer 9 determines the stroke of the modulating piston 40. The spring 75 serves during manually initiated booster operation to restrain the modulating piston rod 67 against movement so that the booster control valve 27 may be operated or moved independently thereof by reason of linkage, to be later described, to effect the hydraulic booster operation. A valve position synchro 77 is connected in the autopilot-valve loop or network and is responsive to or actuated by the modulating piston rod 67. Thus, as diagrammatically illustrated in Figure 4, the synchro 77 is connected between the modulating piston 40 and the autopilot amplifier-transfer valve-modulating piston-valve position synchro loop. The actuating lever 78 of the synchronous device 77 carries a roller 80 which bears on an end of the modulating piston rod 67 so that the synchro operatively follows motion of the rod to impress signals on the amplifier 38 representative of the position of the control valve spool 27 during automatic pilot operation of the device.

The means of connecting the boost piston rod 12 with the control surface, not shown, and the linkage or mechanism for imparting manual or pilot initiated motion to the valve spool 27 of the hydraulic booster may, of course, vary in different installations and aircraft. In the case illustrated there is a relatively long output lever 81 having a fixed pivot 82 at one end and provided at its other end portion with a rotatable pivot or trunnion 83. The booster piston rod 12 is pivotally connected with this trunnion 83 on an axis offset from the axis of the trunnion to obtain a desirable mechanical advantage during certain phases of operation and a push-rod 84 is also pivotally connected with the outer end of the output lever 81. This push-rod 84 transmits motion to and from the control surface, not shown, and it will be seen that upon actuation of the booster pistons 11 the lever 81 is pivoted and the push-rod 84 is actuated to move the control surface. The manually operated means or linkage for moving the booster valve spool 27, as shown, includes control cables 85 for turning or driving horn levers 86 and a lever 87 connected with the latter. Links 88 and 7 connect this lever 87 with a feel lever 90. The feel lever 90 is pivotally mounted or carried by the above described trunnion 83 of the output lever 81 and is a bell crank like part having the link 88 connected with one end and a second link 91 connected with its other end. This second link or push-rod 91 is in turn pivotally connected with a lever 92. The lever 92 has fixed thereto a trunnion or shaft 93 journaled in the case or block 26 adjacent an end of the modulating piston rod 67 and a lever arm 94 is fixed on or integral with the shaft 93 to operate within the block 26. The above described pivot 70 of the lever 68 is carried by the lever arm 94, the pivot being substantially midway between the ends of the arm. As shown in Figures 2 and 3 the lever 68 and the arm 94 are in spaced side by side relation adjacent corresponding ends of the valve spool 27 and modulating piston rod 67 being connected with these elements by the links 71. It will be noted that so long as the lever arm 94 remains stationary the lever 68 is free to pivot thereon. This occurs when the autopilot, not shown, has authority over the booster system.

An output position synchro 95 has its operating lever 96 in engagement with the output lever 81 and leads 97 extend from the synchro to the autopilot, not shown. During autopilot operation of the system motion of the modulating piston 40 produces displacement of the boost valve position synchro 77 which feeds back a signal to the amplifier 38. Motion of the modulating piston 40 results in displacement of the valve spool 27 and operation of the boost pistons 11 so that the aerodynamic control surface, not shown, is displaced. This surface deflection is picked up by the synchro 95 which feeds back a signal to the autopilot amplifier 38 so that the deflection of the aerodynamic control surface is a function of the autopilot signal.

The invention provides a spring loaded hydraulically controlled detent means for the lever 92 or more specifically for the lever arm 94. This detent means, as shown in Figure 2, includes a V notch 98 in the extremity of the lever arm 94 and a lever 100 pivoted in the block 26 and carrying a roller 101 for engaging in the notch. A spring loaded and hydraulically actuated cartridge means controls the detent lever 100. This comprises a cup 102 made up of two threaded together elements to be adjustable or variable in length. One end of the cup 102 is pivoted to the lever 100 and a headed plunger 103 freely enters the other end of the cup. A spring 104 is arranged under compression between the inner end of the plunger 103 and an inner end wall of the cup 102 to urge the roller 101 of the lever 100 into cooperation with the notch 98 and thus resist movement of the lever arm 94. The remote end of the plunger 103 has a piston head 105 operating in a cylinder 106 provided in the block 26. A port 107 in the block 26 leads from the pressure port 41 of the transfer valve to the inner end of the cylinder 106. The port 107 joins the port 41 at the downstream side of the cutoff valve 36 so that the valve 36 is operable to put the cylinder 106 in communication with either the pressure ports 20 and 41 or the return ports 21 and 42.

The lever 100 of the detent means in addition to being controlled and/or actuated by the spring loaded hydraulically energized cartridge and piston arrangement just described 102—103—105—106, is controlled by a mechanical connection with the output lever 81, and by an emergency disconnect means. An arm 108 is rigid and movable with the lever 100 and a link 109 is pivotally connected with the outer portion of this arm. The link 109 has a cam, or lost motion pin and slot, connection 110 with the output lever 81. The link 109 and the connection 110 are such that rotation or movement of the output lever 81 a given extensive distance as a result of hard-over failure of the autopilot system results in movement of the lever 100 to release or free the roller 101 from the notch 98 to permit movement or pivoting of the arm 94 so that the spool 27 of the boost control valve may return to its null or closed position, thus relieving the disturbing force being exerted by the autopilot tie-in. The emergency disconnect means above mentioned may comprise a cable 112 attached to the lever 108. In the event of autopilot failure, malfunction, or the like, the pilot may pull on the cable 112 to free the roller 98 in the notch 101 and thus allow the valve spool 27 of the booster control to return to its null or closed position, relieving the booster mechanism of the disturbing force.

The system or mechanism may further include a manual shift linkage permitting the pilot to operate the aerodynamic control surfaces under emergency conditions as upon failure or malfunctioning of the power booster. This shift mechanism takes advantage of the change in position of the fulcrum of the intermediate lever 134 to reduce the travel of link 7. Lever 134 is pivoted on lever 124 at pivot 135. In normal operation pivot 135 is coincidental with center of the input quadrant 86. The shift linkage may be substantially the same as described in Patent No. 2,437,536, issued March 9, 1948, and includes a ratio shifter lever 120 movable on a fixed pivot 121 by a manual operating cable 122, or the like. An over-center spring cartridge 123 serves to yieldingly hold the lever or crank 120 in either the full line position of Figure 1, or the broken line position of Figure 1. A curved or angular link 133 is pivoted to one end of the crank 120. A strap link 124 and an intermediate link 125 are both pivotally connected with the remote end of the link 133. The strap link 124 has its outer end carried on a fixed pivot 126. The intermediate link 125 is, in turn, pivotally connected with a latch lever 127 journaled on the above described fixed fulcrum or pivot 82. The lever 127 has an arm 128 fixed thereto or integral therewith and linkage 130 operatively connects the above described link 25 of the valves 24 with this arm 128. The latch or lock lever 127 is provided with a notch 131 adapted to receive or cooperate with a pin 132 on the lever 92. In the event of an emergency condition where the hydraulic booster system fails or malfunctions, the pilot may operate the cable 122 to swing the crank 120 180° from the full line position to the broken line position of Figure 1. This moves the links 133, 124, and 125 to the broken line positions of Figure 1 to actuate the lock lever 127 to a position where its notch 131 cooperates with the pin 132 to lock the lever 92 and therefore the lever arm 94 against movement. This, in turn, locks the boost control valve spool 27 against movement, thus locking out the hydraulic booster. Simultaneously with this action the lever arm 128 moves the linkage 130 to turn the valves 24 to the bypass positions where they interconnect the opposite ends of each cylinder 10, disabling the hydraulic means and freeing the pistons 11 and rod 12 for movement through pilot operation. Immediately following this manual shift, to bring the notch 131 and pin 132 into engagement, the pilot may actuate the control stick 140 to move the aerodynamic control surface. With the manual shift linkage in the positions illustrated in broken lines in Figure 1, the geometry of the control linkage is such that (the fulcrum point 135 having moved to the broken line position of Figure 5) the leverage or mechanical advantage is increased to facilitate the manual control operations although the stroke is limited.

In some installations the control system may include an acceleration responsive means which assists or augments the aerodynamic forces fed into the system. As diagrammatically or schematically illustrated in Figure 1, this means may take the form of a weight 141 associated with the control stick 140 to respond to substantial aircraft acceleration. The invention contemplates that the forces imposed on the control linkage by this weight 141 may, in extreme or emergency conditions, disengage the latch or detent means 98—101 at the lever 94. This overriding force moves the valve spool 27 in the correct direction to move the actuating piston 11 in the direction which relieves the disturbing force.

Figure 5 illustrates another form of latch or detent means for the lever 94. In this construction a lever 120 is pivotally supported intermediate its ends within the block 26 and has one end pivotally connected with an end of the spring cup 102. The other end of the lever 120 has a hook or notch 121 for receiving a roller 122 on the free end of the lever 94. As in the previously described form of detent means the lever 108 is fixed to the pin or shaft 124 of the detent lever 120 so that the latch means may be released manually in event of an emergency and released in the event of excessive displacement of the control surface produced by a failure in the autopilot system. It will be seen that the hydraulically conditioned spring loaded latch or detent means of Figure 5 operates in the same manner as the detent means illustrated in Figure 2 and described in detail above.

*Operation*

The operation of the autopilot-hydraulic booster control surface actuating system will now be described under the various typical conditions. When the mechanism is to be utilized as an hydraulic boost system to control or move the aerodynamic control surface by pilot initiated forces, pilot operation of the cables 85 causes the push-rod or link 88 to pivot the feel lever 90 about its pivot 83 since the pistons 11 are temporarily stationary or fixed due to the fact that the valve spool 27 is in its null or closed position. Pivotal movement of the feel lever 90 produces movement of the push-rod 91 which, in turn, pivots the lever 92 and its arm 94 on the trunnion or pivot shaft 93. The autopilot shutoff will have previously moved the valve 36 to the position where it disconnects the transfer valve 37 from the pressure port 20 of the hydraulic boost system. Accordingly, hydraulic pressure will have also been cut off from the cylinder 106 so that the lever 100 is free to move to the full line position of Figure 2 whereby the arm 94 is free to pivot on the shaft 93 by the pilot input force above mentioned. Since the modulating piston 67 is held stationary at this time by its limit spring 75, displacement of the arm 94, as a result of pilot input or command, moves the pivot 70 so that the net result of such movement of the arm 94 is displacement of the valve spool 27 proportional to the input motion of the pilot input link 88. Movement or displacement of the valve spool 27 produces hydraulic unbalance at the sides of the pistons 11 and the piston rod 12 is moved to produce motion of the pivot 83 in the same direction as the initiating pilot input motion, thus nullifying the original displacement of the rod 91 and therefore returning the valve spool 27 to its closed or null position. When the pistons are moved to follow the pilot input motion, as just described, the net effect is translational movement of the pivot 83 and therefore movement of the output rod 84 connected with the control surface, not shown, in accordance with the pilot command.

To condition the system for autopilot operation the autopilot shutoff valve solenoid 44 is energized to rotate the valve 36 to the position where the port 41 of the transfer valve is connected with the pressure port 20 of the hydraulic manifold or block. This makes the transfer valve operative and connects the cylinder 106 of the detent means with the fluid pressure system. Hydraulic pressure admitted to the cylinder 106 acts on the piston head 105 to rotate the lever 100 to the broken line position of Figure 2 where the roller 101 cooperates with the notch 98 to prevent small forces from the pilot input system 85—88, etc. from producing any change in position of the boost valve spool 27. Signals from the autopilot amplifier 38 to the windings 63 and 64 cause movement of the modulating piston 40 in the manner described above. Motion of the modulating piston 40 results in angular displacement of the valve position synchro 77 which, in turn, feeds back a signal to the autopilot amplifier 38 thus providing a position servo loop or system. Motion of the modulating piston 40 is transferred through lever 68 pivoting on pivot pin 70 to the valve spool 27 and the latter is moved or displaced to provide an hydraulic unbalance on the boost pistons 11. This, in turn, actuates the rod 12, output lever 81 and rod 84 to move or displace the aerodynamic control surface, not shown. This motion of the control surface is picked up by the output position servo 95 which feeds a signal back to the autopilot amplifier 38 so that motion or deflection of the control surface is a function of the autopilot signal.

In the event any large forces act on the output lever 81, whether arising from a heavy load on the aerodynamic control surface, a change in damping of the input or output, or an extremely large signal from the autopilot, such force acts on the feel lever 90 either from the output arm 81, the input push-rod 88 or the booster piston rod 12. When any such force is sufficiently great the feel lever 90 will tend to rotate about its pivot 83 producing displacement of the push-rod 91 to pivot the lever 92 and its arm 94 as well as the rocker lever 68 secured to the latter. This will release the detent arm 94 from the detent lever 100, the spring 104 of the detent means being rated to insure such release of the detent means upon the occurrence of a large force such as above mentioned. Furthermore, the cup 102 may be adjusted to regulate the spring 104. When the lever arm 94 overpowers the detent lever and roller 100—101, the boost valve spool 27 is free to return to its null or closed position, thus relieving the disturbing force. The lever arm 94 will return to the latch or detent retained position when the disturbing force is thus removed.

As previously described, travel of the modulating piston 40 is stroke limited and since the modulating piston rod 67 is connected with the spool 27 of the booster valve, this limiting of the modulating piston stroke restricts maximum travel of the spool 27 to limit or determine the maximum angular rate or velocity of control surface motion.

The autopilot transfer valve 37 has a limited hydraulic fluid flow rate and this flow rate restricts or retards the velocity of motion of the modulating piston 40. Since the modulating piston 40 is operatively connected with the booster valve spool 27, the velocity of motion of the latter is likewise limited. This limitation on the velocity of the boost valve spool 27 in turn limits the acceleration of the control surfaces actuated by the system. It should be observed that the maximum acceleration of the valve spool 27 and the control surface connected with the rod 84 is below the force limit set or determined by the rate of the detent spring 104.

Another control provided by the system of the invention involves the link or rod 109 operatively connected with the detent lever 100. As above described, this link 109 is operatively connected with the detent lever 100 and has a cam or pin and slot connection with the output lever 81. The link 109, thus arranged, serves to limit the distance the autopilot can control or move the aerodynamic control surface in the event of a hard over-failure or malfunction of the autopilot circuit. Thus, in the event the output lever 81 is moved a predetermined extensive distance, the rod 109 moves or pivots the lever 100 to free the roller 101 from the notch 98, thus releasing the valve spool 27 to return to its null or closed position under the action of the spring 75 to relieve the disturbing force. Thus the detent means 94—98—101—100 and the link 109 operate to limit displacement of the aerodynamic control surface as effected by autopilot operation.

The pilot, may at any time either with the pistons 11 stationary or moving, override the autopilot control by operating the cable 122 to engage the latch pin 132 and notch 131 and to operate the valves 24 to the bypass positions whereupon manual operation of the stick 140 will serve to directly or manually effect movement of the control surface.

Having described only typical forms of the invention we do not wish to be limited to the specific details herein set forth, but wish to reserve to ourselves any variations or modifications that may appear to those skilled in the art and fall within the scope of the following claims.

We claim:

1. In combination, a fluid pressure actuated mechanism, a part operated by the mechanism, a valve element movable to effect operation of said mechanism, manually operable means for moving said element, cylinder and piston means for moving said element, electrically operated valve means controlling said cylinder and piston means, and means operatively connecting said valve element with the cylinder and piston means for movement thereby and rendered inoperable to transmit movement from the cylinder and piston means to said valve element in the event forces in excess of a given magnitude are applied to said part.

2. In combination; a hydraulically actuated booster, a part operated by the mechanism, a movable valve element for controlling operation of said mechanism, manually operable means for moving said element, fluid pressure operated cylinder and piston means for moving said element, electrically operated valve means controlling said cylinder and piston means and operable independently of the inertia and friction in said manually operable means, and yieldable detent means operatively associating the manually operable means and the cylinder and piston means with the valve element and rendered inoperable to transmit movement from said cylinder and piston means to the valve element in the event a force in excess of a given magnitude is imposed on said part.

3. In a system for operating a control part the combination of; a hydraulic booster mechanism, a movable valve element for controlling operation of said mechanism, manually operable means for moving said element, a modulating piston operatively connected with the valve element, electrically operated means controlling the application of actuating fluid pressure to the modulating piston and operating independently of the inertia and friction in said manually operable means, and spring loaded detent means normally maintaining the operative relation between the modulating piston and the valve element and rendered inoperable to transmit movement from the modulating piston to the element upon the application of a heavy force to said part.

4. In a booster-autopilot system for operating a steering part the combination of; a fluid pressure operable booster for applying force to the part, a control valve for controlling the booster including a movable valve member, fluid pressure actuated modulating means, a lever pivotally connected with the valve member and modulating means to form operative connection between the modulating means and the valve member whereby the valve may be operated by the modulating means, electrically operable valve means controlling the modulating means, manually operable means for moving the valve member including a movable lever arm and a pivot on the lever arm carrying said lever, and means for restraining the lever arm against movement so that said lever is effective in transmitting movement from the modulating means to the valve member and terminating such restraint to free the valve member of the authority of the electrically operable valve means when a large force tends to move the valve member.

5. In a booster-autopilot system for operating a control part the combination of; a fluid pressure operable booster for applying force to the part, a control valve for controlling the booster including a movable valve member, fluid pressure actuated modulating means, an operative connection between the modulating means and the valve member whereby the valve may be operated by the modulating means, electrically operable valve means controlling the modulating means, manually operable means for moving the valve member, and spring-loaded fluid pressure conditioned means associated with said operative connection freeing the valve member of the authority of the electrically operable valve means when a large force tends to move the valve member.

6. In a booster-autopilot system for operating a control part the combination of; a fluid pressure operable booster for applying force to the part, a control valve for controlling the booster including a movable valve member, fluid pressure actuated modulating means, an operative connection between the modulating means and the valve member whereby the valve may be operated by the modulating means, electrically operable valve means controlling the modulating means, manually operable means for moving the valve member, and means for effectively releasing said operative connection when said part is moved an excessive distance under the authority of the electrically operable valve means.

7. In a booster-autopilot system for operating a control part the combination of; a fluid pressure operable booster for applying force to the part, a control valve for controlling the booster including a movable valve member, fluid pressure actuated modulating means, an operative connection between the modulating means and the valve member whereby the valve may be operated by the modulating means, electrically operable valve means controlling the modulating means, manually operable means for moving the valve member, and means for effectively releasing said operative connection when said part is moved an excessive distance under the authority of the electrically operable valve means comprising a mechanical interconnection between said part and said operative connection.

8. In a booster-autopilot system for operating a control part the combination of; a fluid pressure operable hydraulic booster, a mechanical connection between the booster and control part, a control valve controlling the booster including a movable valve member, manually operable means for moving the valve member including a first lever, a modulating piston, a second lever pivoted on the first lever and operatively connecting the piston with the valve member, electrically operable valve means controlling the piston, and latch means made operative by said valve means for holding the first lever against movement whereby said piston under the authority of the electrically operable valve means may move the valve member to control the booster.

9. In a booster-autopilot system for operating a control part the combination of; a fluid pressure operable hydraulic booster, a mechanical connection between the booster and control part, a control valve controlling the booster including a movable valve member, manually operable means for moving the valve member including a first lever, a modulating piston, a second lever pivoted on the first lever and operatively connecting the piston with the valve member, electrically operable valve means controlling the piston, and latch means made operative by said valve means for holding the first lever against movement whereby said piston under the authority of the electrically operable valve means may move the valve member to control the booster, the latch means including a spring yieldable under a heavy load on said part or manually operable means to free the first lever.

10. In a booster-autopilot system for operating a control part the combination of; a fluid pressure operable hydraulic booster, a mechanical connection between the booster and control part, a control valve controlling the booster including a movable valve member, manually operable means for moving the valve member including a first lever, a modulating piston, a second lever pivoted on the first lever and operatively connecting the piston with the valve member, electrically operable valve means controlling the piston, and latch means made operative by said valve means for holding the first lever against movement whereby said piston under the authority of the electrically operable valve means may move the valve member to control the booster, and spring loaded stop means for limiting the stroke of the modulating piston to restrict the maximum rate of motion of the control surface.

11. In a booster-autopilot system for operating a control part the combination of; a fluid pressure operable hydraulic booster, a mechanical connection between the booster and control surface, a control valve controlling the booster including a movable valve member, manually operable means for moving the valve member including a first lever, a modulating piston, a second lever pivoted on the first lever and operatively connecting the piston with the valve member, electrically operable valve means controlling the piston, and latch means made operative by said valve means for holding the first lever against movement whereby said piston under the authority of the electrically operable valve means may move the valve member to control the booster, the electrically operable valve means restricting the flow rate of actuating fluid to the piston to limit the acceleration of said control part.

12. In a booster-autopilot system for operating a control part the combination of; a fluid pressure operable hydraulic booster, a mechanical connection between the booster and control part, a control valve controlling the booster including a movable valve member, manually operable means for moving the valve member including a first lever, a modulating piston, a second lever pivoted on the first lever and operatively connecting the piston with the valve member, electrically operable valve means controlling the piston, and latch means made operative by said valve means for holding the first lever against movement whereby said piston under the authority of the electrically operable valve means may move the valve member to control the booster, and manually operable means for overpowering latch means to effectively terminate the authority of the electrically operable valve means over the booster.

References Cited in the file of this patent

UNITED STATES PATENTS

| | | |
|---|---|---|
| 2,179,628 | Heinzelmann | Nov. 14, 1939 |
| 2,227,375 | Carlson | Dec. 31, 1940 |
| 2,678,177 | Chenery | May 11, 1954 |
| 2,705,940 | Edwards | Apr. 12, 1955 |
| 2,767,689 | Moog | Oct. 23, 1956 |
| 2,773,660 | Rasmussen | Dec. 11, 1956 |
| 2,801,618 | Rasmussen | Aug. 6, 1957 |